(12) United States Patent
Shehory et al.

(10) Patent No.: US 8,738,563 B2
(45) Date of Patent: May 27, 2014

(54) COMPARING DATA SERIES ASSOCIATED WITH TWO SYSTEMS TO IDENTIFY HIDDEN SIMILARITIES BETWEEN THEM

(75) Inventors: Onn Menahem Shehory, Yahud-Monosson (IL); Moran Shochat, Zichron Ya'akov (IL); Eitan Daniel Farchi, Pardes Hana (IL)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/748,415

(22) Filed: Mar. 28, 2010

(65) Prior Publication Data
US 2011/0238613 A1 Sep. 29, 2011

(51) Int. Cl.
| | |
|---|---|
| G06F 9/44 | (2006.01) |
| G06N 7/02 | (2006.01) |
| G06N 7/06 | (2006.01) |
| G06N 5/04 | (2006.01) |
| G06N 7/00 | (2006.01) |
| G06F 11/34 | (2006.01) |
| G06F 11/30 | (2006.01) |
| G21C 17/00 | (2006.01) |

(52) U.S. Cl.
CPC .............. G06N 5/048 (2013.01); G06N 7/005 (2013.01); G06F 11/3419 (2013.01); G06F 11/3409 (2013.01)
USPC ............................................ 706/52; 702/186

(58) Field of Classification Search
CPC .... G06N 5/048; G06N 7/005; G06F 11/3419; G06F 11/3409
USPC ............................................ 706/52; 702/186
See application file for complete search history.

(56) References Cited

U.S. PATENT DOCUMENTS

| 5,788,640 | A | * | 8/1998 | Peters ........................... 600/483 |
|---|---|---|---|---|
| 7,444,397 | B2 | * | 10/2008 | Linville et al. ................ 709/223 |
| 7,559,053 | B2 | | 7/2009 | Krassovsky et al. |
| 2006/0107102 | A1 | * | 5/2006 | Nagin et al. ...................... 714/7 |
| 2007/0180096 | A1 | * | 8/2007 | Roth et al. .................... 709/223 |
| 2008/0177892 | A1 | * | 7/2008 | Alba ............................ 709/231 |
| 2008/0313611 | A1 | * | 12/2008 | Linville et al. ................ 717/115 |
| 2009/0055832 | A1 | * | 2/2009 | Fienblit et al. ................ 718/104 |
| 2009/0222549 | A1 | * | 9/2009 | Gilbert et al. ................. 709/224 |
| 2010/0287416 | A1 | * | 11/2010 | Shacham et al. ................ 714/39 |

FOREIGN PATENT DOCUMENTS

WO 2004003572 1/2004

* cited by examiner

Primary Examiner — Jeffrey A Gaffin
Assistant Examiner — James F Sugent

(57) ABSTRACT

A method that includes: sampling a plurality of parameters associated with a first and a second system to yield a first and a second set of data series, respectively, each data series being associated with samples of a respective parameter; applying, for each two respective data series, a transformation associated with a specified order selected from a plurality of ordered transformations, such that the selected transformation is applied repeatedly to at least one of the two respective data series, wherein, in each repeated application, the transformation is assigned with a different value of a transformation parameter; determining, for each parameter, a one of the plurality of transformation parameters for which the correlation level of the two respective time series is above a specified value; and repeating the applying and the determining with a transformation that is associated with a higher order of the ordered transformations.

18 Claims, 6 Drawing Sheets

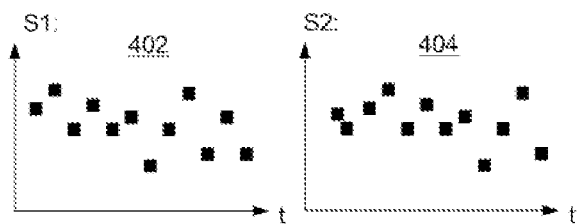
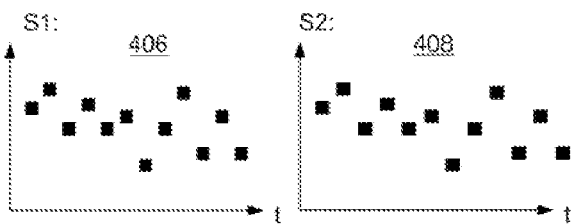
Figure 4A  Figure 4B
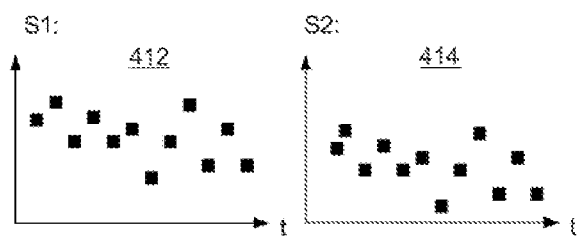
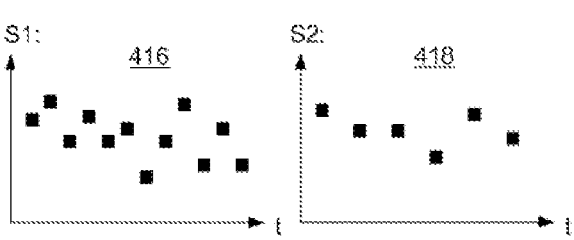
Figure 4C  Figure 4D

# COMPARING DATA SERIES ASSOCIATED WITH TWO SYSTEMS TO IDENTIFY HIDDEN SIMILARITIES BETWEEN THEM

BACKGROUND

1. Technical Field

The present invention relates to systems analysis and more particularly, to identifying hidden similarities between such systems.

2. Discussion of the Related Art

In assessing the level of similarity between two given systems, standard correlation analysis is usually used. Such analysis may expose statistical similarities that may in turn point at a similarity in terms of any specified parameter of the two systems. One use of similarity assessment may be found in the systems testing domain. For example, when one computer system in production environment needs to be tested, a similar system may be tested instead, provided that the level of similarity between the two systems is above a specified threshold. Moreover, in the system testing domain, verifying whether a test properly represents the actual system may be crucial.

However, using standard correlation analysis poses a challenge in identifying hidden similarities between two systems. Hidden similarities are situations in which the existing correlation analysis fails to expose similarities in system parametrical terms, although such similarities do exist. One reason for such failure to expose a similarity is that when existing statistical methods expose a similarity, they do not provide an interpretation of the similarity or alternatively, to its absence.

Consequently, existing correlation analysis cannot provide recommendations regarding action that may be taken in order to increase similarity between the given parameters of the systems.

BRIEF SUMMARY

One aspect of the invention provides a method that includes: sampling, a plurality of parameters associated with a first system and a second system to yield a first set of data series and a second set of data series, respectively, each data series being associated with samples of a respective parameter; applying, for each two respective data series having a correlation level below a specified threshold, a transformation associated with a specified order selected from a plurality of ordered transformations, such that the selected transformation is applied repeatedly to at least one of the two respective data series, wherein, in each repeated application, the transformation is assigned with a different value of a transformation parameter; determining, for each parameter, a one of the plurality of transformation parameters for which the correlation level of the two respective data series is above a specified value; and repeating the applying and the determining with a transformation which is associated with a higher order of the ordered transformations.

Other aspects of the invention may include a system arranged to execute the aforementioned method, and a computer readable program configured to execute the aforementioned method. These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 4A-4D show data series diagrams illustrating an aspect according to some embodiments of the invention;

Figure 1:
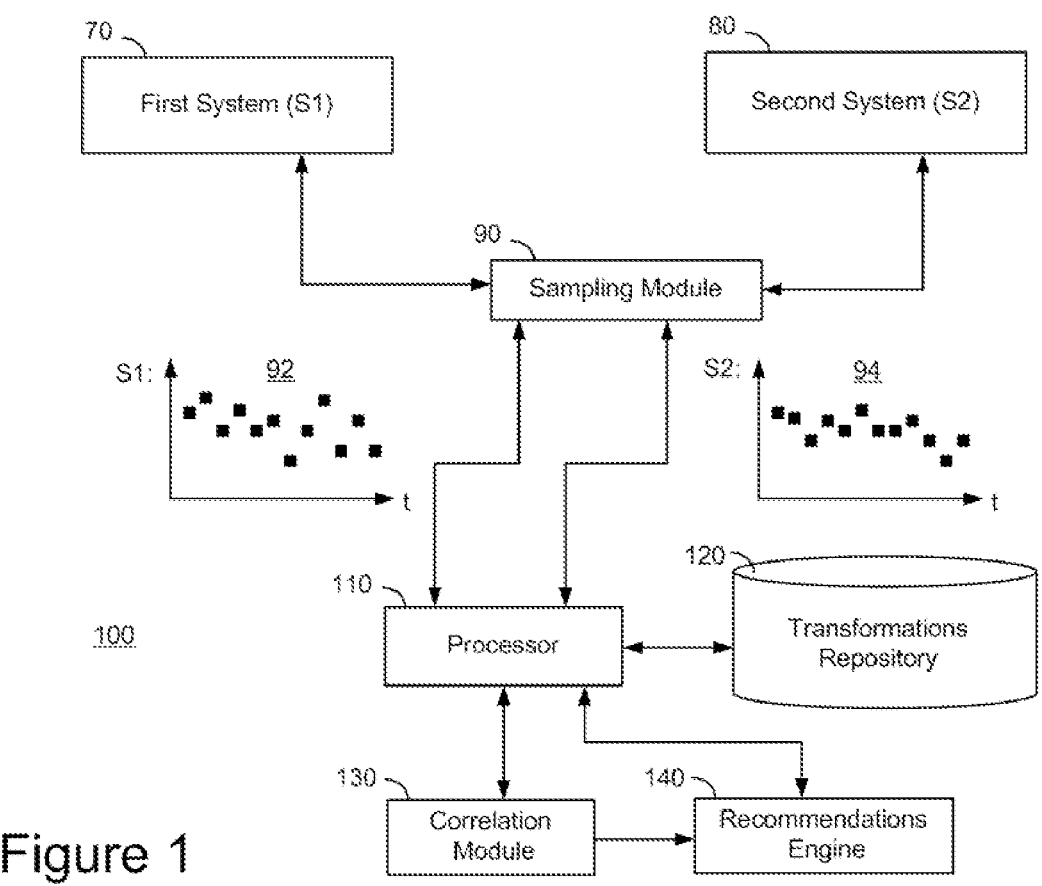
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "software system" as used herein in this application refers to a system based on software forming part of a computer system (a combination of hardware and software). The term software system is related to the application of systems theory approaches in software engineering context. Examples of software systems include computer reservations system, air traffic control software, military command and control systems, telecommunication networks, web browsers, content management systems, database management systems, expert systems, spreadsheets, word processors, and the like. It is understood that a "system: as used herein is not necessarily limited to a software system and may include mechanical, electrical, chemical system, and any other system that may be sampled to yield data series of quantitative representation thereof.

The term "operational parameters" or simply, "parameters" as used herein in this application refers to a quantitative characterization of various functionalities of a given system. Such operational parameters may include, for example, processor load over time, graphic characteristics, heat of a specified element, and the like.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In embodiments of the present invention there is provided a method and a system for comparing parameters collected from at least two systems. According to one aspect of the invention, two given systems are checked for similarity, and the differences between them are analyzed. Embodiments of the present invention identify hidden similarities for which standard correlation analysis techniques do not provide conclusive results. Initially, the systems of inquiry are monitored and their operational parameters are recorded into corresponding data series. Then, standard correlation analysis techniques (the Pearson correlation being a non-limiting example) are applied.

In the case that the standard correlation analysis techniques do not reveal significant correlations between the data series, a set of manipulations and transformations may be applied to the original series. Then, standard correlation analysis techniques may be applied to the manipulated series. As a result of the manipulation, new correlations which were not revealed in the raw data may be discovered. For each type of such discovered correlation, a conclusion may be automatically drawn and the user may be provided with advice regarding its interpretation.

In some cases, and in particular when no correlation is found after applying a transformation, further manipulations may be iteratively applied, to reveal other types of correlations. The iterative process proceeds until a significant correlation is found, until all manipulation methods are exhausted, once specified time and resource allocated for the computation terminates, or by user instruction.

FIG. 1 is a high level schematic block diagram illustrating a system 100 according to some embodiments of the invention. System 100 may comprise a processor 110 and a transformations repository 120. System 100 may be operatively associated with a sampling module 90 that may be in turn coupled to at least two compared systems, S1 70 and S2 80, respectively. System 100 may further be associated with a correlation module 130 and a recommendation engine 140.

In operation, sampling module 90 is configured to sample a plurality of parameters associated with first system 70 and second system 80 to yield a first set of data series 92 and a second set of data series 94, respectively, each data series being associated with samples of a respective parameter. Transformations repository 120 may contain a plurality of ordered transformations. Processor 110 may be configured to: apply, for each two respective data series having a correlation level below a specified threshold, a transformation associated with a specified order selected from repository 120, such that the selected transformation is applied repeatedly to at least one of the two respective data series, wherein in each repeated application, the transformation is assigned with an increased value of a transformation parameter, determine, for each operational parameter, a one of the plurality of transformation parameters for which the correlation level of the two respective data series is above a specified value; and repeat the applying and the determining with a transformation that is associated with a higher order of the ordered transformations.

In order to implement the aforementioned features, processor 110 will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

According to some embodiments, first system 70 is a computer system S1 deployed and operating in a production environment, and second system 80 is another computer system S2 deployed and operating in a test laboratory. S2 is intended to serve as a testing environment that sufficiently resembles S1, such that tests can be performed on S2, in the lab, instead of performing them on S1, in the production environment. It is desirable therefore that S2 shall represent the parameters of operations of S1 as accurately as possible. Indeed, S2 may be built as a clone of S1 but this solution is usually too expensive or impractical. Therefore, one needs to check the level of similarity, and the differences, between S1 and S2. Standard statistical similarity measures may be applied, but these not always reveal similarities, even when these are clearly there. More importantly, when similarities are revealed by standard statistical tools, no interpretation is provided regarding their meaning in the sense of test adequacy and possible changes to be made in it.

Using sampling module 90, operational parameters of computer systems S1 and S2, may be derived in a form of time series (or data series) corresponding each to the operational parameters such as processor load, response time and the like. The time series (or data series) may initially be compared by computing their average and standard deviation. In case of a different average, for example, of the processor load, we can not only report to the user that the test (S2) is different from S1, we can also indicate that the load differs by a factor of the ration between average load (S2) and average load (S1).

Consequently, a recommendation to change a specified parameter of one of the systems (such as the processor load) may be made. In case of equal or similar average and different standard deviation, it would be possible again to report of a difference between S1 and S2, however this time our recommendation will be to increase or decrease the amplitude of the fluctuations in S2 by the ratio between standard deviation (S1) and standard deviation (S2).

However, similarity in the average and the standard deviation are not sufficient to infer system similarity. Once these are examined, the next stage in similarity checking is the computation of the Pearson correlation level or a similar correlation criterion. If the correlation level is close to 1, a report of a high level of similarity between S1 and S2 may be made. However, in many cases, the correlation level is not close to 1. Specifically, the result may even be closer to 0, allegedly indicating no correlation between the systems. Yet, the fact that the Pearson correlation (or any similar criterion) found no correlation is not a good indicator for concluding that the systems are indeed different and specifically that the test run on the lab system being inadequate. Further, it does not indicate in what properties the difference manifests. The system according to the embodiments of the invention may identify and report on these differences, and may further suggest ways to overcome them such that S2 be adjusted to S1.

As noted above, exposing the hidden similarities between two systems may be achieved by applying a set of transformations to at least one of the data series derived from one of the systems. In an exemplary embodiment, the transformations are used to examine whether loads applied in S2 were applied at the correct timing and frequency so that they mimic properly S1. A time shift may be applied for that purpose. Specifically, the whole time series measured on S2 may be shifted to the right (or left), and only then the Pearson correlation is computed. Several shifts may be tried. From all shifts tried, the shift with the highest correlation level is selected. If this level is sufficiently close to one (e.g., it is greater than 0.7), it may be concluded that the shifted time series represents a case of similarity to S1. A report that the test possesses of a correct structure and frequency may be made with a recommendation that test should be performed with a change in its start time equal in size to the shift applied to the time series for arriving at the best level of correlation.

In some cases, such a time shift will not result in a satisfactory level of correlation. This, again, does not mean that the test system is not a good one. Further transformation may be tried each at a time, in accordance with a specified order. Overall, the iterative process of applying transformations to at least one data series allows to check whether S1 (production) and S2 (test) systems are well correlated, and it provides recommendations on what needs to be done to better adjust S2 such that the test becomes more adequate, to better mimic and test S2.

Figure 2:
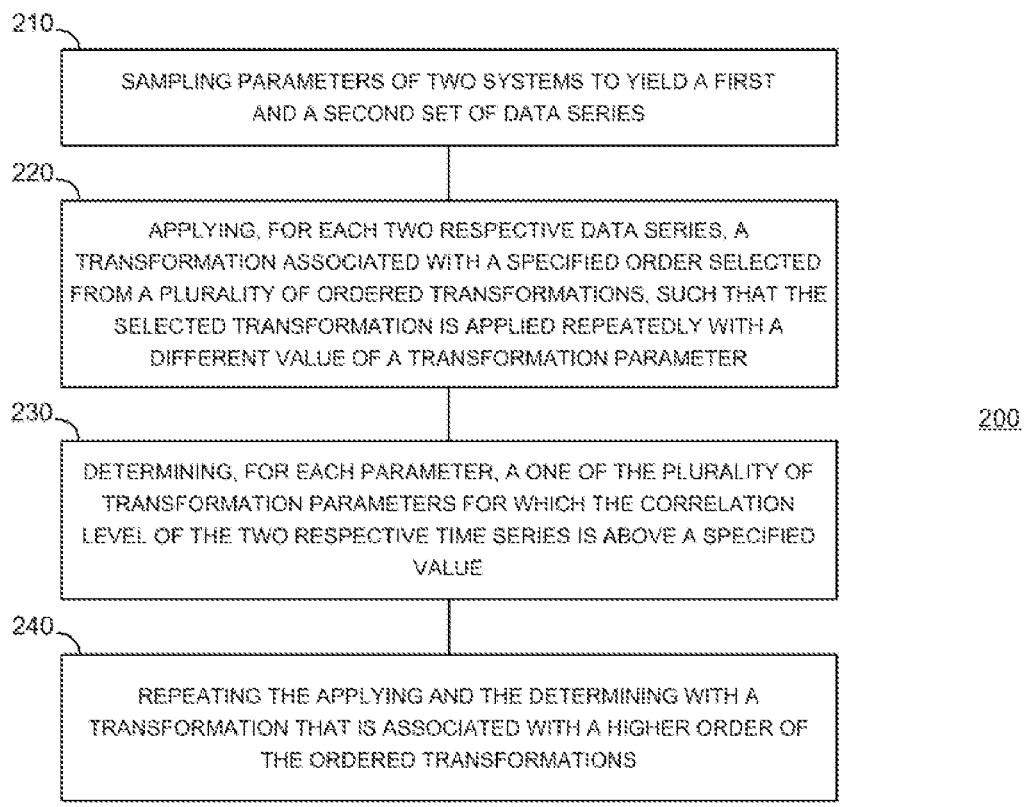
FIG. 2 is a high level flowchart diagram illustrating a method according to some embodiments of the invention.

FIG. 2 is a high level flowchart diagram illustrating a method 200 according to some embodiments of the invention. Method 200 comprises: sampling a plurality of parameters associated with a first system and a second system to yield a first set of data series and a second set of data series, respectively, each data series being associated with samples of a respective parameter 210; applying, for each two respective data series having a correlation level below a specified threshold, a transformation associated with a specified order selected from a plurality of ordered transformations, such that the selected transformation is applied repeatedly to at least one of the two respective data series, wherein, in each repeated application, the transformation is assigned with a different value of a transformation parameter 220; determining, for each parameter, a one of the plurality of transformation parameters for which the correlation level of the two respective time series is above a specified value 230; and repeating the applying and the determining with a transformation that is associated with a higher order of the ordered transformations 240, wherein at least one of the sampling, the applying, the determining, and the repeating is performed by at least one computer.

Figure 3:
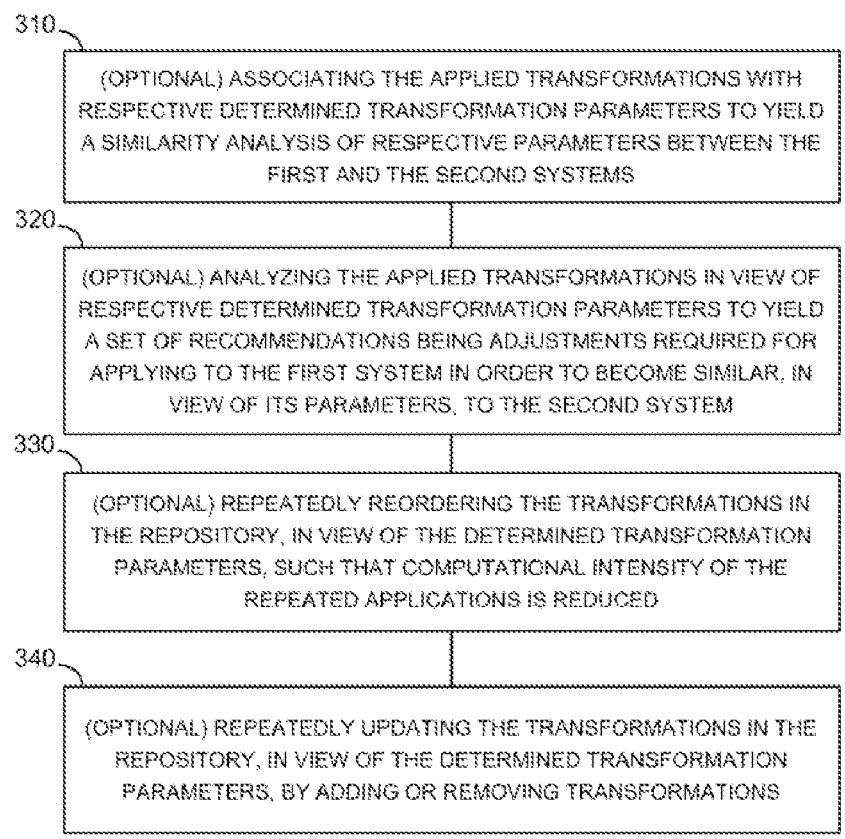
FIG. 3 is a high level flowchart diagram illustrating an aspect relating to the method according to some embodiments of the invention.

FIG. 3 is a high level flowchart diagram illustrating optional features relating to method 200 according to some embodiments of the invention. According to some embodiments of the invention, method 200 further comprises associating the applied transformations with respective determined transformation parameters to yield a similarity analysis of respective parameters between the first and the second systems 310.

According to some embodiments of the invention, method 200 further comprises analyzing the applied transformations in view of respective determined transformation parameters to yield a set of recommendations being adjustments required for applying to the first system in order to become similar, in view of its parameters, to the second system 320.

According to some embodiments of the invention, method 200 further comprises repeatedly reordering the transformations in the repository, in view of the determined transformation parameters, such that computational intensity of the repeated applications is reduced 330.

According to some embodiments of the invention, method 200 further comprises repeatedly updating the transformations in the repository, in view of the determined transformation parameters, by adding or removing transformations 340.

FIGS. 4A-4D show time series diagrams illustrating an aspect according to some embodiments of the invention. According to this aspect, exemplary transformations that manipulate the data series are shown.

FIG. 4A shows a time shift (or any shift along the x-axis of the series). Specifically, data series 404 has been shifted to the right relatively to data series 402. According to this feature, a data series may be shifted to the right or to the left. Since it is unknown what degree of shift will result in the best improvement in the correlation level, multiple shifts may be examined in parallel or iteratively. According to some embodiments of the invention, specified heuristics may be used in order to select preferred initial shift values. One of these heuristics is to apply a shift such that the first peaks of the two time series coincide. A variation of this heuristic may be to shift to the second peak, third peak, and so forth, as finding peaks is relatively simple.

FIG. 4B shows a linear time transformation being a non-limiting example of any linear transformation applied to the x-axis (horizontal axis) of the data series. According to this feature, the original time values (or x-axis values) of the series are multiplied by a positive multiplier value. Specifically, in data series 408 the original x-axis has been multiplied by a multiplier greater than 1 relatively to data series 406. Consequently, for a multiplier greater than 1, the time series is "stretched", and for a multiplier smaller than 1, the time series is being "shrunk". Since it is unknown which multipliers would result in the best improvement in correlation level terms, multiple values of multipliers may be examined in parallel or iteratively. According to some embodiments, specified heuristics may also be used in selecting the multipliers. One of the heuristics is to select a multiplier such that the transformation will shift one or more peaks of the transformed series towards one or more peaks of the second series. Computing the value of such a multiplier is not a complex task: for instance, one can use the ratio between the distances of the first two peaks of the two original series as a multiplier. As a result of this transformation, the peaks of the two series may be better aligned, thus increasing correlation level.

Similarly, non-linear time (or x-axis) transformation may be applied. In some cases, no linear transformation is suitable for aligning the two data series. In such cases non-linear transformations may be applied. The result of the non-linear transformation may be similar to the one sought when applying linear transformation, however it may be more difficult to find out what transformation should be applied. According to some embodiments, specified heuristics may also be used in selecting the multipliers. An exemplary heuristic may be to apply a few major categories of transformation functions: logarithmic, polynomial and exponential. In other words, the elements of at least one of the data series is multiplied by a value of a non-linear transformation function. There are several unknown factors: what type of function is better for increasing correlation and what are the specific properties of this function (for example, coefficients, exponents, and the like). As there is no trivial way to set these values optimally, a few values may be tried in parallel or iteratively. Also, under the assumption that rough approximations may be derived with relatively simple functions, according to some embodiments, the simpler functions with coefficients that induce simplicity are applied first (for example, value=1 and exponent=2).

FIG. 4C shows a linear multiplying applied to the y-axis (vertical axis) of the data series. Specifically, the measurements (samples) of data series 414 have been multiplied by a positive number smaller the 1 in relation to the measurements (samples) of data series 412. Various other forms of multiplying of the measurements (samples) of the data series may be used, including multiplying measurements (samples) of one series by a specified series to yield a "filtering" effect such that some measurements (samples) are made greater while other are made lesser. Similarly, some measurement may be omitted altogether from the data series by the aforementioned "filtering" effect.

FIG. 4D shows local averaging that may also be applied as a form of transformation. Specifically, in data series 418 every two consecutive measurements (samples) were averaged into one measurement (sample) relatively to data series 416. In some cases, it may be difficult to expose correlation because the events recorded in the time series (or data series) are not correlated at the granularity level provided in the series. For example, this may happen when the event in one system occurs, arbitrarily, either before or after the supposedly corresponding event in the second system. It may however be the case that correlation exists at another level of granularity. To expose such cases, in some embodiments of the invention, new times series (or data series) are generated from the original ones. For this purpose, averages over sets of measurements (usually small sets) taken from the original series are computed. For example, every three points in the original series may become a single average in the new series. Then correlation level is computed. If the correlation level is above a specified threshold, the need to change the granularity of data is reported and a recommend to apply the averaging is made. In case that the correlation level is below the specified threshold, averaging over larger sets may be tried. According to some embodiments, some transformations may be applied to averaged data series.

According to some embodiments, a Fourier transform of the time series may also be applied as a transformation. In some cases, it is difficult to find correlations among the original time series, even when the aforementioned transformations are applied. By applying a Fourier transform to both series, they are transformed each into a sum of oscillating functions (known as the frequency space). Then, it would be possible to compute correlation level among the oscillating functions.

According to some embodiments, time segmentation may also be applied as a transformation. In some cases, segments of the series may have a high level of correlation whereas other segments have little correlation. As a result, the whole series do not exhibit high levels of correlation. In some embodiments, a partition of the series into segments is made, subsequently applying the aforementioned transformations (and other ones) to the segments. As it is generally unknown what segmentation policy would optimize correlation, heuristics may be used again. One heuristics may be based on usage patterns of the systems of inquiry. Usage patterns have an effect on the metric values recorded during system monitoring. For example, system load of an enterprise computer system strongly depends on the business working hours and activities. Specifically, the load increases at the start of the workday, and decreases once it ends. In such a case one can partition the time series to workday time and other time. Finer partitions are also possible. Other load patterns exist too. Some of these are known and may be used to infer preferred partitions. In cases where load patterns are not known, they may be learned automatically from the system (methods for doing this are known in the art). When no pattern is known, the time series may be partitioned into an iteratively increasing number of segments, in a linear or exponential way (for example, 2, 4, 6, 8 . . . , 2, 4, 8, 16 . . . , or any other series of number of segments).

According to some embodiments, non-linear correlations between measured values (samples) may also be applied in conjunction with the transformations. Whereas all of the aforementioned transformations refer to changes in timing and granularity of that measurements (samples), non-linear correlations between measured values refers to the measured values themselves. In some cases, no linear correlation can be found, no matter what time or granularity manipulation is applied. This does not mean that there is no correlation—it merely means that a linear one does not exist. The next step would be therefore to apply a non-linear correlation analysis. There are several ways to apply such analysis. One simple way is to transform one of the series (or both) to a different functional space (such as logarithmic, exponential, and polynomial). In some embodiments, heuristically selection of functions at an increasing degree of growth is made, later to be applied in this transformation. After the transformation, the correlation level is being computed. If it satisfies the required level of correlation a report is made suggesting that correlation was found but that the specified parameter (e.g. processor load) measured have a non-linear functional relation as indicated by the selected transformation function. The report may additionally include suggested adjustments to the specified parameter in order to increase similarity between the systems. If the level of correlation is not satisfying, there is an iterative increase in the level of growth in the transformation function.

In addition to comparing hidden similarities between two given systems, embodiments of the invention may be used for test selection. This may be done by comparing two tests in lieu of systems S1 and S2. The purpose in test selection is to reduce the number of tests and the total test time without reducing the coverage of a given test suite. Given a set of tests T1, T2 . . . TN, embodiments of the present invention may be used to find and remove tests that are similar to other tests in respect to certain performance aspects. This embodiment may also enable to run only the tests that are not covered by any other test.

Advantageously, embodiments of the present invention may allow correlating between smaller and cheaper test system and their respective production systems in order to find out flaws in the test environment and setting. It also allows controlling development process activities.

Advantageously, embodiments of the present invention may improve the quality and adequacy of testing. Embodiments of the present invention provide a method and system that may find whether test systems are well correlated to the production systems. Embodiments of the present invention may further provide recommendation for changes in the test system to better adjust it to the production system. embodiments of the present invention further allow comparison between two (or more) tests to find out which one is better for testing the target system or in order to reduce the total test time (test selection).

Advantageously, conclusions and recommendations may be provided, as interpretations of the correlations discovered by system 100 or method 200 or alternatively, such conclusions and recommendations may be drawn based on the lack of such similarities. These recommendations may be useable for modifications in the systems in order to increase similarity between them.

Referring now to yet another embodiment of the invention, there is provided a graphical user interface tool that may execute, in cooperation with a human user, aspects of the present invention. The graphical user interface (GUI) tool may present a user with graphic representation of at least two data series (or time series) that in turn, may represent operational or physical characteristics of a system (either computer system or non-computer system). The graphic representation of each data series may be in any multidimensional (more than one dimension) representation of numerical data. For example: charts, plots, graphs, histograms, multidimensional data points and the like.

The user is then provided with the ability to graphically manipulate at least one of the aforementioned graphic representations. In response to the graphic manipulations, the corresponding data series are updated with respective values. Simultaneously, specified functions may be applied to the updated data series to yield a quantitative representation associated with at least one of the updated data series or with the relationship between them. The quantitative representation may be, but is not necessarily limited to a statistic relationship, such as the correlation level between the two data series. While the user continues to graphically manipulate the graphic representations of the data series, the quantitative representation (e.g. of the relationship between the manipulated data series) is continuously monitored and may be presented to the user in view of the accumulated manipulation he or she has performed over the graphic representation.

Advantageously, the aforementioned GUI tool may assist a user in the investigation of hidden similarities between at least two systems whose respective data series are graphically presented.

Figure 5:
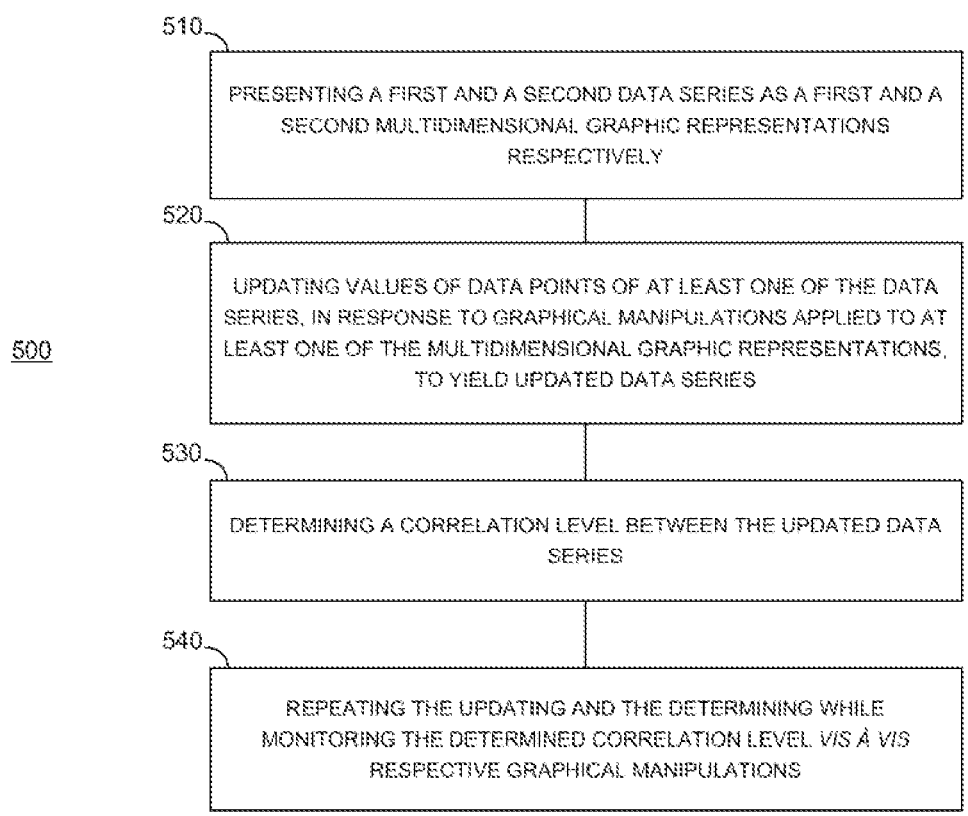
FIG. 5 is a high level flowchart diagram illustrating an aspect relating to the method according to some embodiments of the invention.

FIG. 5 is a flowchart illustrating a method 500 that may be used to implement the aforementioned GUI tool. Method 500 comprises: presenting a first and a second data series as a first and a second multidimensional graphic representations respectively 510; updating values of data points of at least one of the data series, in response to graphical manipulations applied to at least one of the multidimensional graphic representations, to yield updated data series 520; determining a quantitative representation associated with the at least updated data series or a relationship between the updated data series 530; and repeating the updating and the determining while monitoring the determined quantitative representation vis à vis respective graphical manipulations 540. In executing method 500, at least one of the presenting, the updating, the determining, and the repeating is executed by at least one processor.

According to some embodiments of the invention, various image editing functionalities may be provided to the user so that the user may apply the graphic manipulation of his or her choice to the graphic representations of the data series. Non-limiting examples for such image editing capabilities may comprise: selecting, copying, pasting and deleting portions of the graphic representation; drawing new data points, and erasing data points and portions from the graphic representation.

Figure 6:
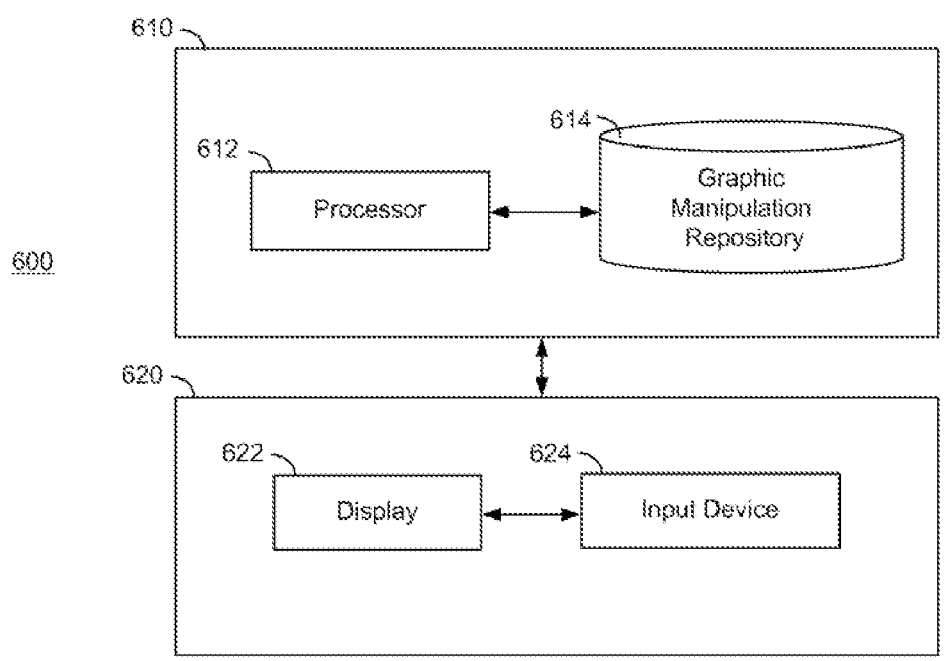
FIG. 6 is a high level schematic block diagram illustrating a system according to some embodiments of the invention.

FIG. 6 is a high level schematic block diagram illustrating a system according to some embodiments of the invention. System 600 comprises: a graphical user interface 620 having a display 622 in operative association with an input device 624; and a backend module 610 having a processor 612 and a graphic manipulations repository 614, wherein graphical user interface 620 is configured to present over display 622, a first and a second data series as a first and a second multidimensional graphic representations respectively, wherein processor 612 is configured to: update values of data points of at least one of the data series, in response to graphical manipulations selected via input device 624 from graphic manipulations repository 614 and applied to at least one of the multidimensional graphic representations over display 622, to yield updated data series; determine a quantitative representation associated with the at least one updated data series or a relationship between the updated data series; and repeat the updating and the determining while monitoring the determined quantitative representation vis à vis respective graphical manipulations.

According to some embodiments of the invention, the graphic manipulation may be executed by the user using any user interface available (input device 624) such as a mouse or another pointing device, or by hand via a touch-screen, touch pad, keyboard and the like.

Further editing capabilities may comprise: selecting, annotating and highlighting a data point on the graphic representation of a data series (or directly in the data series), or a set of such data points, or a chart portion of the graphic representation.

Further editing capabilities may comprise: enabling a user to hold and move selected elements of the graphic representation (points or segments) using any input device, such that the graphic representation is stretched or squeezed to fit the new location of the manipulated data points on the graphic representation. Specifically, selected points may be specified as "anchor points" such that the location of the selected anchor points will be fixed and will not change once other selected points are moved around. A possible embodiment of the anchor points feature would be in selecting three data points, two of which are anchor points and one which is located on the graphic representation somewhere in-between the anchor points. Once the non-anchor point is moved, stretching and squeezing will be applied only to the portion of the graphic representation confined by the anchor points. Another application for the anchor point feature would be selection of a portion of the graphic representation such that the intersections of the borders of the portion with the graphic representation line are automatically specified as anchor points. The non-anchor point may then be selected manually or automatically by locating the middle point of a portion of the graphic representation in-between two anchor points. Yet another embodiment of the anchor points feature comprises a selection of an anchor points according to any one of the aforementioned embodiments and a selection of a non-anchor line segment (or a set of non-anchor points) in between the anchor points, and applying the movement manipulation on them as suggested above.

In accordance with the updating feature of the present invention, any graphic manipulation of the graphic representation yields an update to the corresponding data on the respective data series. For example, when portion of the graphic representation, line segments and data points are selected and annotated on the graphic representation, the corresponding data points in the data series are automatically selected and annotated as well, thus visualizing the selection to the user. When data points are added to the (visual part of the) graphic representation or deleted from it, the corresponding data series are automatically updated accordingly. Similarly, when the locations of points or chart segments are changed on the chart, the corresponding data series are automatically updated accordingly. When the graphic representation is stretched or squeezed, the corresponding data series are automatically updated to express the change. In case that a function was computed on a data series (e.g., average, STD, or any other function), of which the result is either a single value or a new data series, once the graphic representation and its corresponding data series undergo a change, the function will be recomputed to express this change.

According to some embodiments of the invention, either by user-choice or automatically, dynamic monitoring of the manipulations and their effect on the statistic relationship between the data series is further provided. In order to implement the dynamic monitoring, embodiments of the present invention compute and present to the user: a set of statistics, their dynamic change (due to the manipulations), and their comparison to original values before manipulations to the graphic representation were applied. These statistics may include average, standard deviation, min value, max value, level of Pearson correlation between compared charts or series (e.g., before and after change), the area under the chart line, and others. Specifically, the dynamic change monitoring may comprise recording and presenting a set of historical change events to which the statistics will be applied and among which comparison will be made. This can optionally be presented in a tabular, textual or a graphical presentation.

According to some embodiments of the invention, all of the aforementioned editing capabilities may be selected and executed automatically, in accordance with a specified order. Specifically, the order may be in accordance with specified guidelines that may be in turn user-selected or automatically selected. Optionally, the automated activation of capabilities may be based on specified or automatically learned heuristics. Learning can either be done per user, or per system. For instance, if the user always prefers to select two anchor points and then perform stretching upwards, the system may learn this and offer to perform this automatically on behalf of the user. Additionally, if the user always prefers to have the statistics displayed, these can be displayed automatically without user intervention or by user approval.

According to another embodiment of the invention, there is provided a roll-back capability enabling to retract from changes and restore previous versions of the graphic representations. The roll-back capability may also allow displaying two or more versions for visual comparison therebetween.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowcharts and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:

obtaining a first data series and a second data series, wherein the first data series being associated with values of a parameter sampled from a first system, wherein the second data series being associated with values of the parameter sampled from a second system;

calculating a correlation level between the first and second data series;

in response to the correlation level being below a predetermined threshold, processing the first and second data series by:

repeatedly selecting a transformation from a transformation repository, applying the transformation to the second data series, and computing the correlation level of the first data series and the transformed second data series;

selecting, based on the computed correlation levels, the transformation of the plurality of transformations that yields a correlation level above the predetermined threshold; and providing a recommendation of a modification to the second system based on the selected transformation;

wherein the plurality of transformations are associated with an order, and wherein said selecting the transformation from the plurality of transformations is performed based on the order, and reordering the transformations in the transformation repository to reduce computational intensity of the repeated applications;

wherein at least one of said calculating, said applying and said providing is performed by a processor.

2. The method of claim 1 further comprising applying the recommendation on the second system, thereby increasing similarity between the first and second systems.

3. The method of claim 1, wherein at least two transformations in the transformation repository differ by a transformation parameter.

4. The method of claim 1 further comprises updating the transformations in the repository in view of a transformation parameter of the selected transformation.

5. The method of claim 1, wherein the order is modified based on user selections over time based on automatic learning.

6. The method of claim 1 further comprises partitioning the first and second data series, wherein the correlation of a first corresponding pair of segments of the first and second data series having a correlation above the predetermined threshold, wherein the correlation of a second corresponding pair of segments of the first and second data series having a correlation below the predetermined threshold, and wherein said processing is performed with respect to the second corresponding pair of segments.

7. The method of claim 6, wherein the recommendation is associated with a portion of a time of execution of the second system.

8. The method of claim 1, wherein the transformations of the repository are configured to simulate configuration change of the second system.

9. The method of claim 1, wherein the first system is a computer system and the second system is a test system.

10. The method of claim 1, wherein the transformations are configured to yield a similarity analysis of respective parameters between the test and the computer systems.

11. The method of claim 1, wherein the correlation level is determined by computing a Pearson product moment of the first and second data series.

12. The method of claim 1, wherein at least some of the transformations comprise at least one of: linear series manipulations; non-linear series manipulations; mapping of at least one of the series from time domain into frequency domain.

13. The method of claim 1, wherein the second data series comprises data points assigned along a unit axis, and wherein at least one of the transformations comprises multiplying the unit axis of the second data series with a specified value.

14. The method of claim 13, wherein the unit axis is associated with time.

15. The method of claim 1, wherein the first and second data series are time series associated with a specified time base.

16. The method of claim 1 further comprising monitoring the first and second systems to sample values of the parameter during execution thereof, wherein said obtaining comprises obtaining the monitored values.

17. A computer program product comprising a non-transitory computer readable medium having instructions retained thereon, which instructions, when provided to a processor, cause the processor to:

obtain a first data series and a second data series, wherein the first data series being associated with values of a parameter sampled from a first system, wherein the second data series being associated with values of the parameter sampled from a second system;

calculate a correlation level between the first and second data series;

in response to the correlation level being below a predetermined threshold, process the first and second data series by:

repeatedly selecting a transformation from a transformation repository, applying the transformation to the second data series, and computing the correlation level of the first data series and the transformed second data series;

selecting, based on the computed correlation levels, the transformation of the plurality of transformations that yields a correlation level above the predetermined threshold; and providing a recommendation of a modification to the second system based on the selected transformation;

wherein the plurality of transformations are associated with an order, and wherein said selecting the transformation from the plurality of transformations is performed based on the order, and reordering the transformations in the transformation repository to reduce computational intensity of the repeated applications.

18. A computerized apparatus comprising a processor coupled to a memory, wherein said processor is configured to:

obtain a first data series and a second data series, wherein the first data series being associated with values of a parameter sampled from a first system, wherein the second data series being associated with values of the parameter sampled from a second system;

calculate a correlation level between the first and second data series;

in response to the correlation level being below a predetermined threshold, process the first and second data series by:

repeatedly selecting a transformation from a transformation repository, applying the transformation to the second data series, and computing the correlation level of the first data series and the transformed second data series;

selecting, based on the computed correlation levels, the transformation of the plurality of transformations that yields a correlation level above the predetermined threshold; and providing a recommendation of a modification to the second system based on the selected transformation;

wherein the plurality of transformations are associated with an order, and wherein said selecting the transformation from the plurality of transformations is performed based on the order, and reordering the transformations in the transformation repository to reduce computational intensity of the repeated applications.

* * * * *